United States Patent
Hall et al.

(10) Patent No.: US 10,726,220 B2
(45) Date of Patent: Jul. 28, 2020

(54) TOOL TRACKING AND MONITORING DEVICE AND METHOD

(71) Applicants: David R Hall, Provo, UT (US);
Jerome Miles, Spanish Fork, UT (US);
Clint Gibson, St. George, UT (US);
Casey Webb, Spanish Fork, UT (US)

(72) Inventors: David R Hall, Provo, UT (US);
Jerome Miles, Spanish Fork, UT (US);
Clint Gibson, St. George, UT (US);
Casey Webb, Spanish Fork, UT (US)

(73) Assignee: Hall Labs LLC, Provo, UT (US)

(*) Notice: Subject to any disclaimer, the term of this patent is extended or adjusted under 35 U.S.C. 154(b) by 0 days.

(21) Appl. No.: 15/977,185

(22) Filed: May 11, 2018

(65) Prior Publication Data
US 2019/0026510 A1 Jan. 24, 2019

Related U.S. Application Data

(60) Provisional application No. 62/535,504, filed on Jul. 21, 2017.

(51) Int. Cl.
| | | |
|---|---|---|
| *G06K 7/10* | (2006.01) | |
| *B25F 3/00* | (2006.01) | |
| *G06K 19/07* | (2006.01) | |
| *G06Q 10/08* | (2012.01) | |
| *B25F 5/00* | (2006.01) | |

(52) U.S. Cl.
CPC ......... *G06K 7/10366* (2013.01); *B25F 5/00* (2013.01); *G06K 19/0723* (2013.01); *G06Q 10/087* (2013.01); *B25F 3/00* (2013.01)

(58) Field of Classification Search
CPC .................................................. G06K 7/10366
See application file for complete search history.

(56) References Cited

U.S. PATENT DOCUMENTS

| | | | | |
|---|---|---|---|---|
| 4,523,882 A * | 6/1985 | Hengesbach | ........ | B25H 1/0021 248/653 |
| 6,989,749 B2 * | 1/2006 | Mohr | ........ | G06Q 10/087 235/385 |
| 7,168,538 B2 * | 1/2007 | Pena | ........ | H01R 13/72 191/12.2 R |
| 8,683,909 B1 * | 4/2014 | Copus | ........ | F41A 23/16 182/127 |
| 9,791,231 B1 * | 10/2017 | Lyren | ........ | F41A 17/063 |
| 2004/0159761 A1 * | 8/2004 | Lipsky | ........ | A61B 90/50 248/323 |

(Continued)

FOREIGN PATENT DOCUMENTS

WO WO-2012035815 A1 * 3/2012 ............... B25F 5/00

*Primary Examiner* — Christle I Marshall (57) ABSTRACT

A tool tracking and monitoring device is disclosed. The device is made up of: a tool base, having a controller and a transceiver; a tool handle; interchangeable tool bodies with ID tags; and user IDs. The interchangeable tool bodies attach to the tool handle. The transceiver is adapted to receive information from the tool body ID tags and the user IDs and relay that information to the controller; this allows the controller to monitor the use of the tool bodies. The controller is configured to regulate access to the tool bodies according to permissions associated with the tool body ID tags and the user IDs. The device is also adapted to connect with freestanding power tools.

18 Claims, 4 Drawing Sheets

(56) References Cited

U.S. PATENT DOCUMENTS

| | | | |
|---|---|---|---|
| 2010/0229450 A1* | 9/2010 | Becker | F41C 23/14 |
| | | | 42/90 |
| 2013/0118767 A1* | 5/2013 | Cannaliato | B25F 5/021 |
| | | | 173/29 |
| 2016/0373457 A1* | 12/2016 | Matson | H04L 67/306 |
| 2019/0247994 A1* | 8/2019 | Angold | B25H 1/0028 |

\* cited by examiner

TOOL TRACKING AND MONITORING DEVICE AND METHOD

CROSS-REFERENCE TO RELATED APPLICATIONS

This application is a continuation-in-part of U.S. Provisional Application 62/535,504 filed Jul. 21, 2017, the entire contents of which are incorporated herein by reference.

TECHNICAL FIELD

This invention relates generally to tools and connecting tools and more specifically to smart devices.

BACKGROUND

Tools, especially power tools, are essential to accomplishing many tasks. There are certain tools that are specialized and expensive. There are also locations where a diversity of people with differing experience levels and responsibility levels with access to a diversity of tools some of which are more dangerous than others.

Two examples will be helpful. First, a business that uses expensive power tools has employees with many years of training in performing certain tasks and knowledge of the best tools to use with those tasks. This business also trains inexperienced people in those tasks. The employees with many years of experience and know how in accomplishing the tasks without damaging or ruining the expensive tools must be able to access the tools. The trainees are still learning and without proper training could incur costs to replace those tools and should have access to certain tools restricted. Monitoring how trainees use certain tools gives management the ability to determine when trainees are ready to use tools without supervision. For some tasks, the trainees are proficient enough with some less specialized and expensive tools to accomplish these tasks on their own and need access to these other tools.

As a second example, a family has tools in the garage. The parents are capable and quite handy with a variety of tools. The preteen children do not have the familiarity with several of the tools for the parents to feel comfortable with their children having free access to those tools.

SUMMARY

In a first aspect, the invention is a tool tracking and monitoring device. The device includes a tool base, having a controller and a transceiver; a tool handle; interchangeable tool bodies with ID tags; and user IDs. The interchangeable tool bodies attach to the tool handle. The transceiver is adapted to receive information from the tool body ID tags and the user IDs and relay that information to the controller. This allows the controller to monitor the use of the tool bodies. The controller is configured to regulate access to the tool bodies according to permissions associated with the tool body ID tags and the user IDs.

In a second aspect, the device is adapted to track and monitor freestanding power tools. Each power tool has a tool ID that permits the controller to regulate use of and monitor use of the tool. Permissions associated with specific user ID's allow users to access the tools.

Further aspects and embodiments are provided in the foregoing drawings and detailed description.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

This application incorporates by reference all the subject matter disclosed in the following references: US Patent Application No. 20150284221A1 by David R. Hall et al., filed Apr. 3, 2014 and entitled "Compact Motorized Lifting Device"; US Patent Application Serial No. 20160236916A1 by David R. Hall et al., filed Apr. 27, 2016 and entitled "Multiple Motorized Lifting Devices Mounted to a Structure"; U.S. Pat. No. 9,860,361 by David R. Hall et al., filed Jan. 24, 2017 and entitled "Wirelessly Controlled Inflator"; U.S. patent application Ser. No. 15/426,556 by David R. Hall et al., filed Feb. 7, 2017 and entitled "Compact Inflator"; U.S. patent application Ser. No. 15/441,928 by David R. Hall et al., filed Feb. 24, 2017 and entitled "Intelligent Current Limiting to Enable Chaining of AC Appliances"; U.S. patent application Ser. No. 15/443,312 by David R. Hall et al., filed Feb. 27, 2017 and entitled "Intelligent Current Limiting to Enable Chaining of DC Appliances"; U.S. patent application Ser. No. 15/443,434 by David R. Hall et al., filed Feb. 27, 2017 and entitled "Intelligent Current Limiting to Enable Chaining of AC and DC Appliances"; U.S. patent application Ser. No. 15/487,999 by David R. Hall et al., filed Apr. 14, 2017 and entitled "Overhead Mounting System"; U.S. patent application Ser. No. 15/488,860 by David R. Hall et al., filed Apr. 17, 2017 and entitled "Overhead Mounting System for Daisy-Chained Devices."

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "personal control device" is meant to refer to devices such as smart phones; tablet computing devices, such as iPad or Galaxy Tab; laptop computers; or other computing devices.

As used herein, "digital assistant" is meant to refer to computing devices including but not limited to: Amazon Echo, Amazon Echo Dot, Google Home, Google Home Mini, Nest, and HomePod.

As used herein, "hub" is meant to refer to a computing device that contains: a processor; non-transitory memory; a user interface; a microphone and is adapted to connect to a network and other devices, the connections can be wired or wireless.

A detailed description of embodiments of an apparatus is provided below. Those of skill in the art will recognize that the features of the apparatus as described by example could be arranged and designed in a variety of different configurations without departing from the scope of the claims. Thus, the detailed description below and the depictions of embodiments in the figures are merely representative of the apparatus.

Tools, especially power tools are essential to accomplishing many tasks. There are certain tools that are specialized and expensive, each tool is an investment. The tracking and monitoring device allows administrative users to regulate who uses tools. It also monitors the use of those tools. In one embodiment, the device is a tool with a base and a tool handle. Individual tool bodies attach to the handle. By having a tool handle that the individual functional bodies of each tool attach to, space and cost can be reduced. The amount of space necessary to store the tool bodies of the tool is less than that necessary to store each tool if each tool had its own handle instead of the attaching to a handle in the system. Cost is also reduced, as the tool bodies do not require the construction of a whole tool.

In one embodiment, the tool system can replace a garage full of separate tools. The system includes a tool base, a tool handle, and various tool bodies that connect to the tool handle. The tool bodies include drill, impact driver, oscillating, rotary, sanding, reciprocating saw, trim saw, jigsaw, light, router, grinder, and other bodies to attach to the tool handle. The handle includes a trigger mechanism, which runs each tool body when attached to the handle. The tool bodies are interchangeable, such that any of the tool bodies are able to attach to the handle. Each tool body includes an ID tag; in one embodiment the ID tag is an RFID tag. In other embodiments other methods such as Wi-Fi or scanable bar codes are used. The tool bodies function as a standalone power tool would, for example the drill body accepts drill bits, the jigsaw accepts different saw blades, and so on for each of the tool bodies.

In another embodiment, the tool base connects to freestanding power tools such as a table saw, band saw, drill press, jointer or one or more of various other power tools. In this embodiment the tool base has a power outlet to which the freestanding power tool is attached. The freestanding power tool has as tool ID and communicates with the tool base.

In one embodiment, the controller, which is located in the tool base, runs the system. The controller stores user identification profiles and tool identification profiles. The controller then regulates which users can use which tools. In another embodiment the tool base connects to a cloud-based server, which runs the system. In another embodiment the tool base connects to a hub, which runs the system. In an alternative embodiment the tool base connects to a personal control device.

In certain embodiments, the tool tracking and monitoring system interconnects with other devices via a power network. In some embodiments, the tool system connects with a smart garage system via wireless network.

In one embodiment, the controller and transceiver are disposed within the tool base. In one embodiment, the controller and transceiver are networked on a printed circuit board disposed within the handle of the device. The controller stores and/or processes various information, such as usage statistics, power consumption, duty cycle limits, a device ID, approved user IDs, and/or a schedule of events. In certain embodiments the system allows a user to program the tool, to only be operable during specific times of the day, specific days of the week, for only a certain number of consecutive minutes and/or hours, etc. The system allows a user to also program the tool, to only be used by designated users. In some embodiments the controller connects to a personal control device. The administrative user has a user interface, generally installed as an application on the user control device, that allows the administrative user to program the tool tracking and monitoring system.

In certain embodiments, "checking out" the tool requires the user to request use of the tool, such as. The tool has a profile that indicates which users are permitted to that tool, the user ID transmits to the tool base where the controller compares the user ID with the tool profile to verify that the transmitting user ID is permitted to use the attached tool body. The includes an electronic switch operable only by the device controller, which controls the delivery of power to the device motor via the general device switch, such as a trigger or other manual switch. The device controller maintains the electronic switch in the "off" state until the device is "checked out" and permission is received. Upon verifying the user permission, the device controller maintains the electronic switch in the "on" state for a set or indefinite period of time. The period of time is stored in tool profile on the controller. The period of time is programmable and varies depending on the user. At the end of the period of time, the device controller switches the electronic switch off. Alternatively, the user "checks in" the device in, which sends a communication to the controller revoking the permission.

Such features described above provide a theft deterrent and assist businesses that provide tools for use by employees in tracking and controlling such assets. In many businesses, such as in the construction industry and others where employees travel away from a central business location to a field location for work, or such as in the automotive repair industry, employees are currently required to provide their own tools. This is so far the best way that employers have found to deter theft and ensure tool assets are properly cared for and kept track of. However, the system of the present disclosure allows an employer to track tools, prevent theft, and track usage to a specific user. This system allows an employer to reduce out-of-pocket costs for employees and attract more/better employees. The controller even stores the employer information so that if the tool is stolen, one who finds the tool is able to identify the owner of the tool. In certain embodiments included on the body of the tool are a web address and/or name of the application where one who finds the tool may download the app. The tool includes a serial number and/or scanable serial number that allows the one who finds the tool to identify the tool owner. In one embodiment, the application accesses the cloud-based server, which stores the tool owner's name, address, phone number, and/or other contact information. The tool will not operate until returned to the owner, which further deters theft.

The features described above also allow an employer to track how each employee uses a particular tool to identify which employees are responsible for the most wear to the tool. For example, employee A uses the tool 10 hours a week, and employee B uses the tool 2 hours a week, but both employees are responsible for 50% of the usage/power consumption of the device. This indicates a discrepancy in the way the tool is being used and cared for and could indicate that employee B is harder on the tool or is using the tool improperly. The usage statistics help identify which employees would benefit from further training with the tool.

Figure 1:
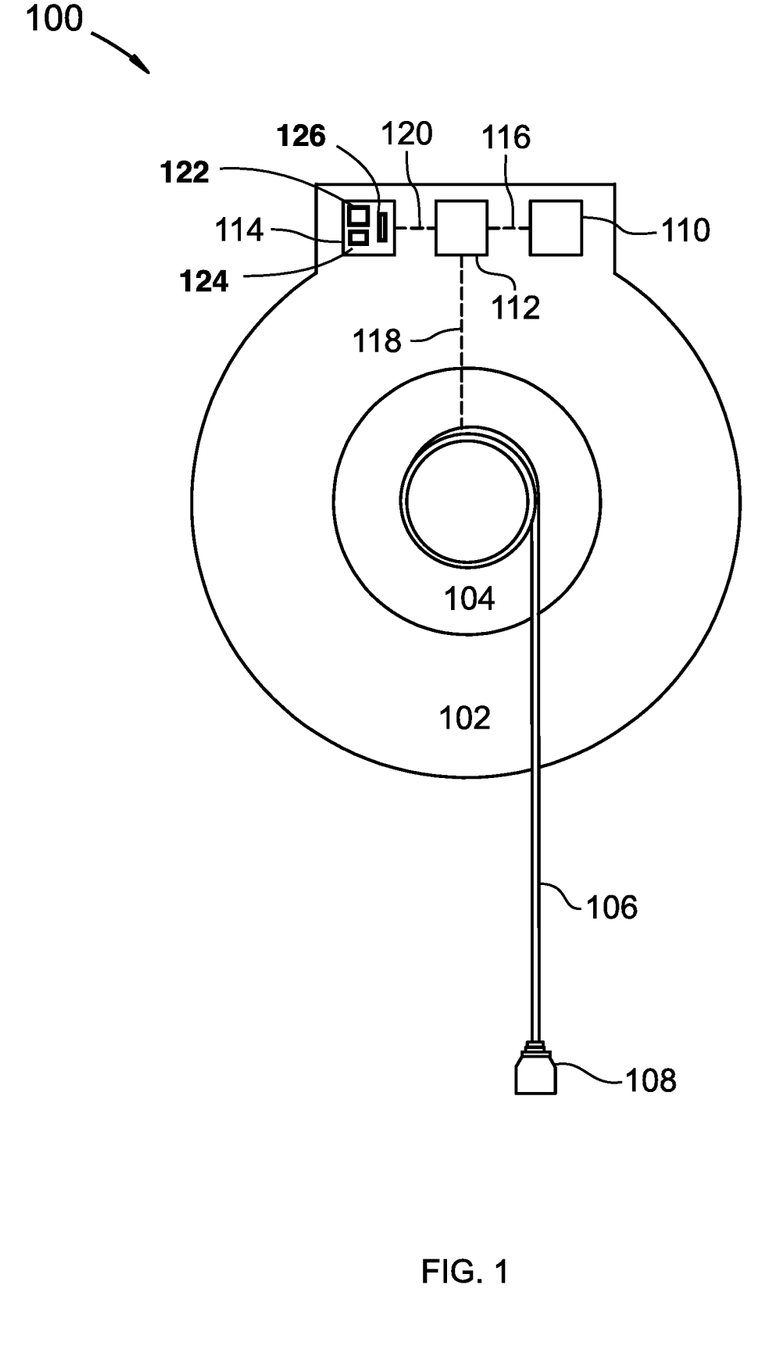
FIG. 1 is a cut away view of the tool base unit.

FIG. 1 depicts a front cut-away view of the tool base assembly 100. Tool base assembly 100 includes housing 102, reel 104, cord 106, printed circuit board 114, controller 122, and transceiver 124. Reel 104 is positioned within and rotatably connected to housing 102. Cord 106 is mechanically attached to reel 104. Controller 122, and transceiver 124 are disposed within the tool system assembly. For example, the controller 122 and transceiver 124 are networked on a printed circuit board 114 disposed within the tool system assembly. The controller 122 stores and/or processes various information, such as usage statistics, power consumption, duty cycle limits, a device ID, approved user IDs, and/or a schedule of events. Only users with proper authorization are permitted to use the tool system and its accompanying tools. A user will have a user ID. In some embodiments the user ID is a personal control device, such as a smart phone. In another embodiment the user id is attached to and associated with a user's ID badge for working at a company, for example an RFID tag is embedded in a user's ID badge. In another embodiment the user ID is another identifier such as a bar code or QR code.

Cord 106 attaches to freestanding power tools such as a table saw, band saw, drill press, jointer, and any of various other tools. The tool has a tool ID, such as an RFID tag, in the tool that communicates with the tool base. In one embodiment the tool base has a power outlet 108. The freestanding power tools connect to the tool base through the female power outlet 108. The tool base controls access to the freestanding tools. Each of the freestanding power tools has a tool ID; the tool ID has an associated tool profile. Users also have a user profile associated with each user ID. The user profile includes a list of the power tools each user has permission to use. To use a tool a user must have permission and have that permission stored in the user profile. When a user turns on a tool the controller identifies the tool, through the tool ID, and the user through the user ID, the controller then verifies that the user has permission to use the tool. If the user does not have permission to use the tool the controller will not allow the tool to be turned on. If the user does have permission to use the tool the controller will allow the tool to turn on. The administrator of the tool system sets up the permissions for users and for tools. The administrator also sets up time schedules for when the tools can be used.

Figure 2:
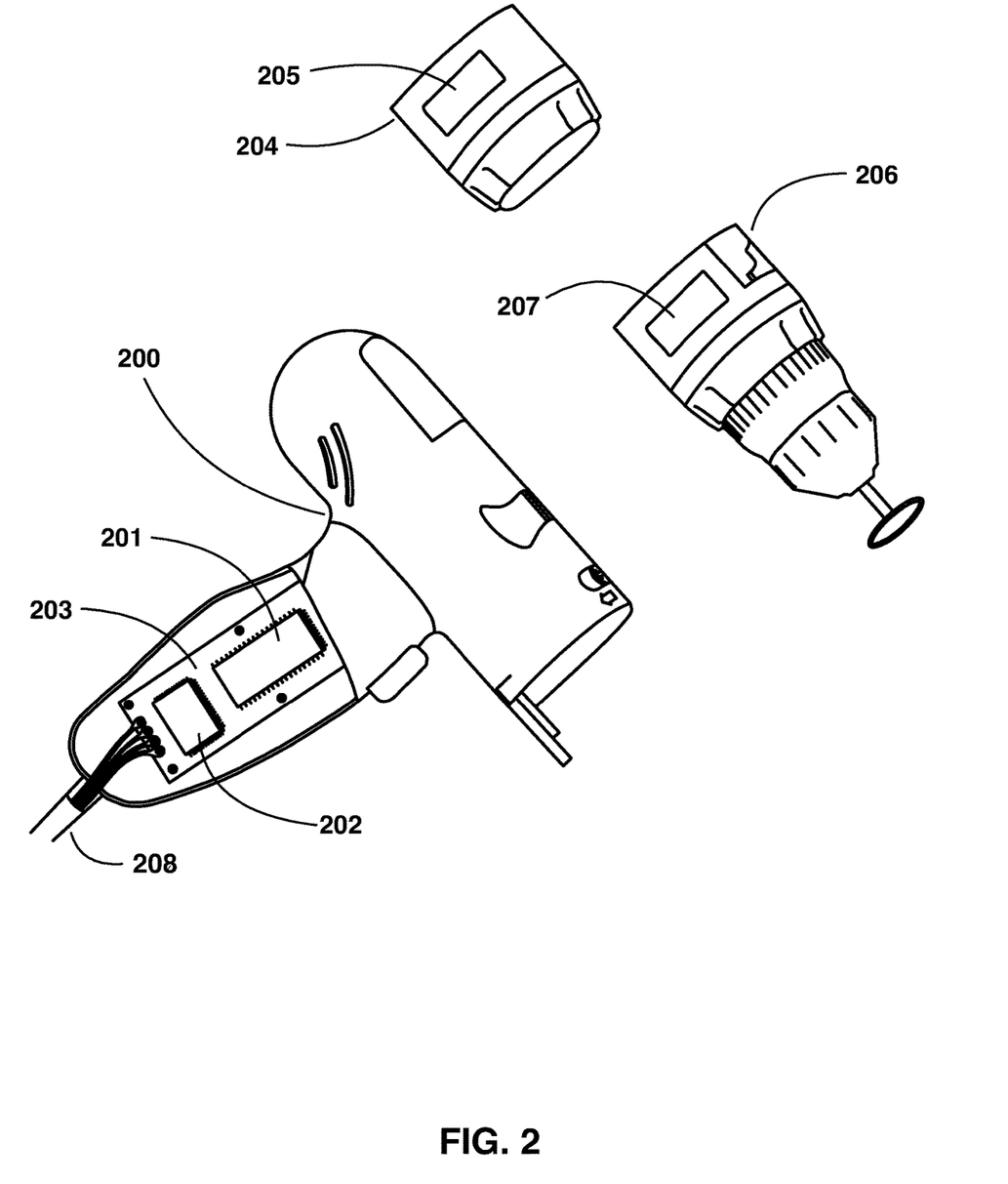
FIG. 2 is a perspective view of the tool handle and two tool attachments.

Now referring to FIG. 2, the tool handle 200, controller 201, and transceiver 202 are disposed within the corresponding tool handle. For example, the controller and transceiver are networked on a printed circuit board 203 disposed within the handle of the device. The controller 201 stores and/or processes various information, such as usage statistics, power consumption, duty cycle limits, a device ID, approved user IDs, and/or a schedule of events. The handle 200 is designed so that multiple tools attach and can use the same handle. The handle is connected to the tool base unit. Cord 208 holds the connecting cables and enables the base unit to communicate with the handle. A light 204 attaches to the device 200. The light 204 contains a device ID 205 such as an RFID tag. The device transceiver 202 receives a signal from the tool ID 205, if the user has an ID with appropriate permissions programmed for that ID to use the light then the controller 201 will allow power to the device. If a user does not have an ID approved to use the light the controller 201 will interrupt the power and the device will not turn on with the light attached. Another tool, such as rotary tool 206 also contains a tool ID 207 such as an RFID tag. The transceiver 202 receives a signal from the tool ID 207, if the user has an ID with appropriate permissions programmed for that ID to use the rotary tool 206, the controller will allow power to the device. If the user does not have an ID with appropriate permissions programmed for that ID to use the rotary tool 206, the controller will interrupt power and the device will not function with the rotary tool 206 attached. In certain embodiments the system allows an administrative user to program the tool, to only be operable during specific times of the day, specific days of the week, for only a certain number of consecutive minutes and/or hours, etc. The system allows an administrative user to also program the tool, to only be used by designated users in the application.

Figure 3:
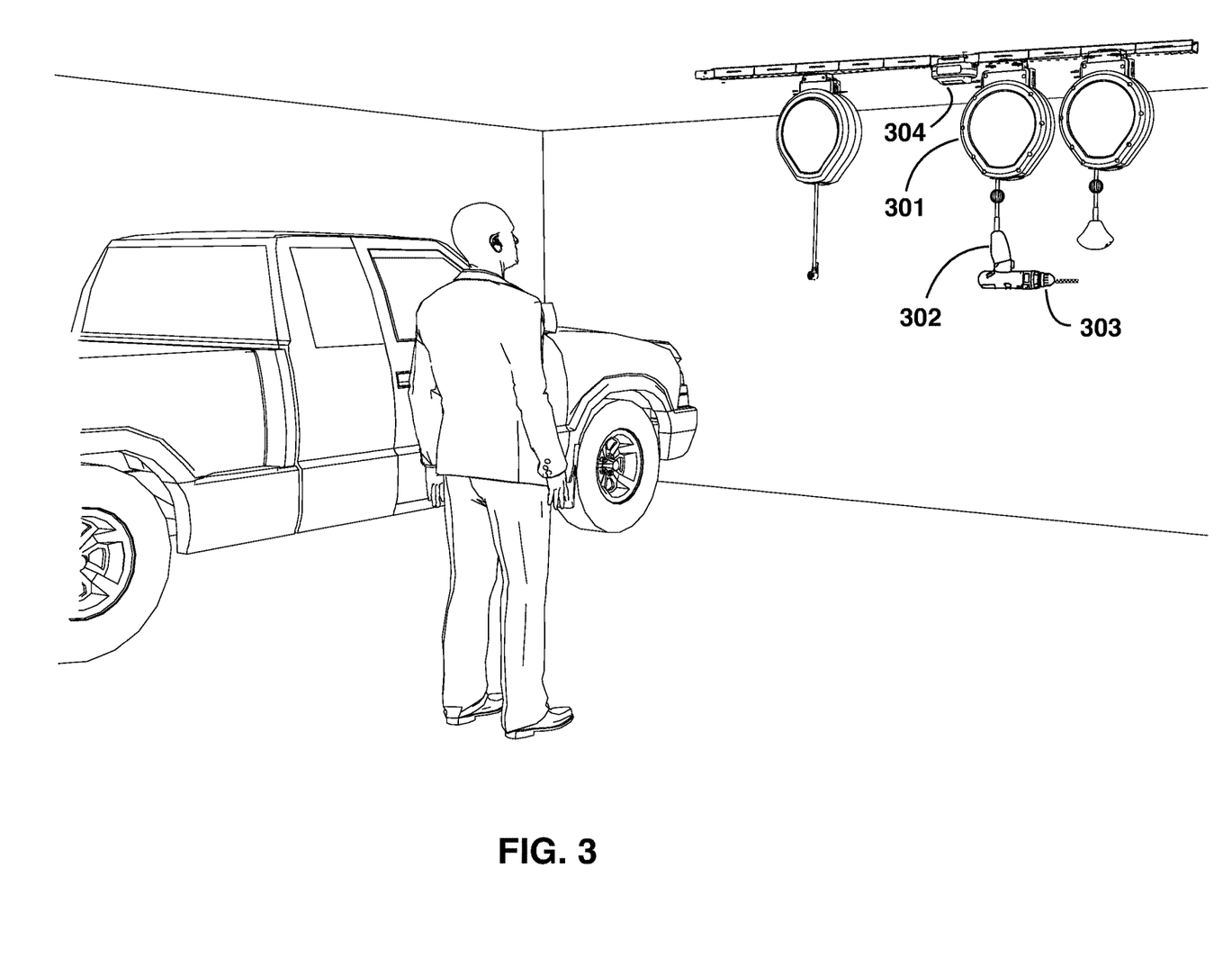
FIG. 3 is a view of the tool system installed in a garage.

In FIG. 3, the tool base with its cord housing 301 is attached to an overhead mounting system. The user comes within range and the user ID; in this case a program stored on a personal control device communicates the user ID to the transceiver in the tool base 301. The tool handle currently has a drill tool attachment 303 connected, the tool ID in the drill attachment 303 communicates with the controller in the tool base 301. The tool system 301 identifies the user and compares the permissions associated with the user profile to the tool ID for the drill attachment 303. When the user profile includes the drill attachment 303 in the permitted to use category the user is able to activate the tool handle 302 with the drill attachment 303 connected. In another embodiment the drill attachment is classified in the not permitted to use category, in this case the controller in the tool base 301 will not allow activation of the tool handle 302 with drill attachment 303 connected. In certain embodiments there is an unassigned category of tool attachments, this means that the user profile does not have the tool attachment assigned to either the permitted to use category or the not permitted to use category. When a tool attachment is in the unassigned category the default preference for the user profile govern the activation of that tool attachment for that user profile. The default preference depends upon the user profile, some user profiles will be set to permitted to use if unassigned other user profiles will be set to not permitted to use if unassigned.

In addition to regulating the use of tool attachment by users, the tool system also monitors and records the use of each tool attachment. When a user activates a tool attachment and begins using that tool attachment, the tools system saves all data associated with the user and the tool attachment. This data includes; time the tool attachment was in use, speed or intensity at which the tool attachment was run, and other data relevant to the use of the tool. By recording and storing this data, the owner of the tool system can monitor who is using the tool attachments and associate the use of the tool attachment to the wear on that tool attachment.

In another embodiment the tool system allows teaching and supervision while still associating use with a specific user profile. A user will connect the tool device with the tool attachment; the tool system will authenticate the user ID. The user profile will indicate that the attachment is in the not permitted category for that user, there is an additional setting that is teaching or supervised, when a tool attachment falls in this category for the specified user, the tool system will search for another user with a supervisor or teacher setting associated with their user profile. The tool system will allow the student or supervisee to activate the tool attachment while the teacher or supervisor is present, the system will also save all data for that session to the student's profile so that the supervisor, and other supervisors that were not present can access the data and see how the student is using the tool attachment.

In certain embodiments the tool system 301 is part of a system that has a hub 304 for controlling and monitoring multiple components. The tool system is connected to the hub 304. The central hub 304 is connected to a cloud-based server. In some embodiment the user profiles are stored on the tool base. In other embodiments they are stored on the hub, and in others they are stored on the cloud-based server. Preferably the tool system 301 stores the user ID and user permissions associated with a user profile, the rest of the user profile including data about the user's use of each tool attachment will be stored on the cloud-based server. The cloud-based server will also store a backup of the user profile including user ID and user permissions.

Figure 4:
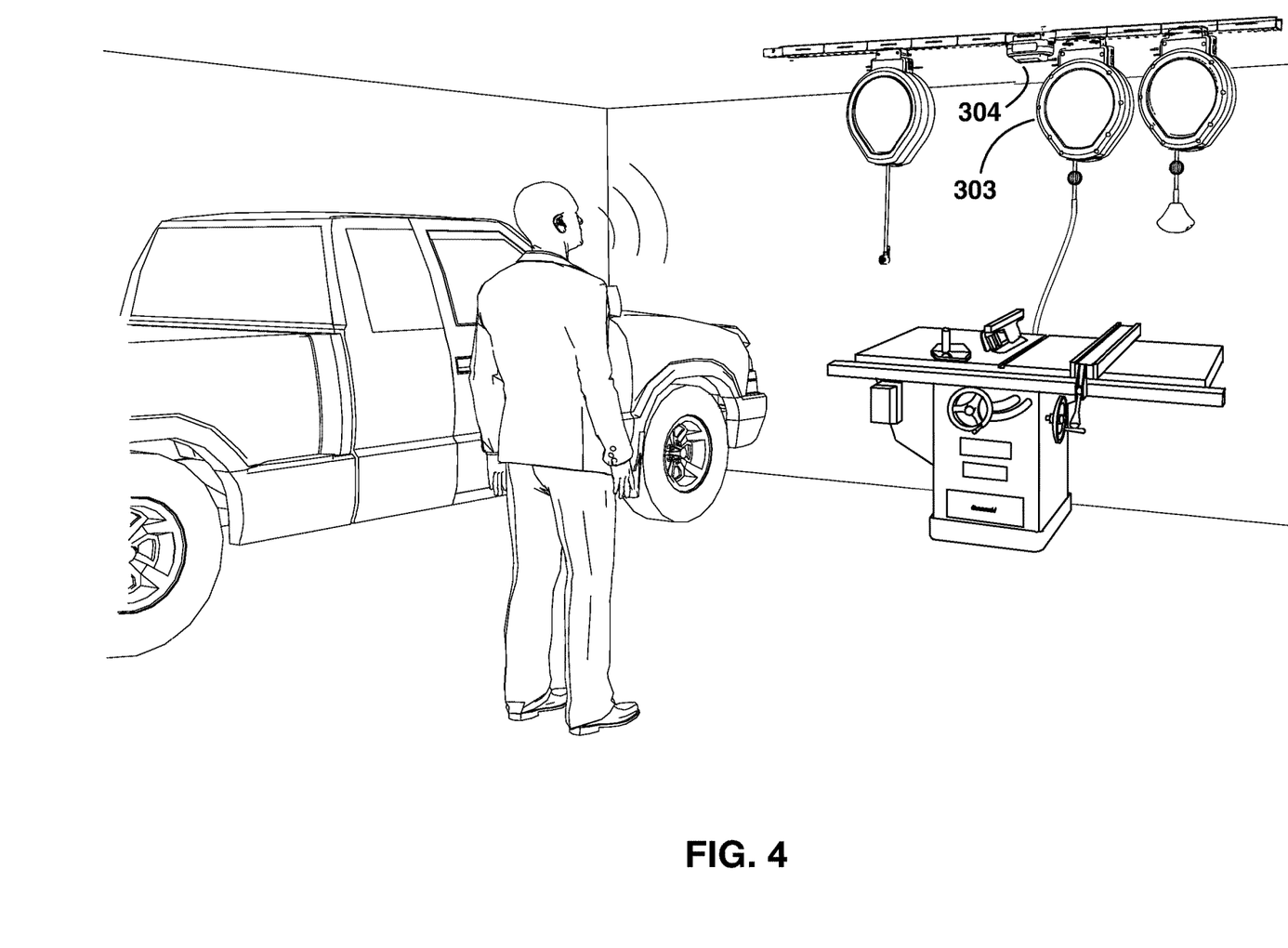
FIG. 4 is a view of the system with a freestanding tool.

In FIG. 4, cord 402 attaches tool base 401 to table saw 403. The table saw has a tool ID, such as an RFID tag, that communicates with the tool base 401. In one embodiment, the tool base has a power out cord 402 that connects to the table saw. The tool base 401 controls access to the table saw 403. The table saw 403 has a tool ID; the tool ID has an associated tool profile. Users also have a user profile associated with each user ID. The user profile includes a list of the power tools each user, has permission to use. To use the table saw 403 a user must have permission to use the table saw and have that permission saved in the user profile. When a user turns on the table saw 403 the controller identifies the table saw 403, through the tool ID, and the user through the user ID, in this case a smart phone, the controller then verifies that the user has permission to use the table saw 403. If the user does not have permission to use the table saw 403 the controller will not allow the table saw 403 to be turned on. If the user has permission to use the table saw 403 the controller will allow the table saw 403 to turn on. Additionally, in some embodiments the administrative user will program the length of time for which the table saw 403 can be used, once the time has elapsed the controller will turn the table saw 403 off. The administrator of the tool system sets up the permissions for users and for tools. The administrator also sets up time schedules for when the tools can be used. In one embodiment the administrative user sets the permissions for the table saw 403 such that it can be used between the hours of 8:00 A.M. and 6:00 P.M. In certain embodiments there are specific users who have profiles with permissions that can override the time constraints and use the table saw 403 outside of the programmed times.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. A tool tracking and monitoring device comprising:
   an overhead mounting system attached to a ceiling;
   a tool base having a controller and a transceiver;
   a tool handle;
   interchangeable tool bodies with ID tags; and
   user IDs;
   wherein the interchangeable tool bodies attach to the tool handle;
   wherein the transceiver is adapted to receive information from the tool body ID tags and the user IDs and relay that information to the controller;
   wherein, the controller monitors and records the use of the tool bodies; and
   wherein, the controller is configured to regulate access to the tool bodies according to permissions associated with the tool body ID tags and the user IDs;
   wherein, the tool base attaches to the overhead mounting system;
   wherein, the controller is configured to track the use of each tool body by each user ID.

2. The invention of claim 1, wherein the user ID is a personal control device.

3. The invention of claim 1, wherein the user ID is a name badge.

4. The invention of claim 1, wherein the user ID is an RFID tag.

5. The invention of claim 1, wherein the tool ID is an RFID tag.

6. The invention of claim 1, wherein the use of certain tools is not restricted to identified users.

7. The invention of claim 1, wherein the tool base is connected to multiple other tools attached to the overhead mounting system.

8. The invention of claim 7, wherein the tool base connects to a hub.

9. The invention of claim 8, wherein the hub stores the permissions for tool access.

10. A tool tracking and monitoring device comprising:
    an overhead mounting system attached to a ceiling;
    a tool base having a controller and a transceiver;
    at least one tool with ID tag; and
    user IDs;
    wherein the transceiver is adapted to receive information from the tool ID tags and the user IDs and relay that information to the controller;
    wherein, the controller monitors and records the use of the at least one tool; and
    wherein, the controller is configured to regulate access to the tool according to permissions associated with the tool ID tags and the user IDs;
    wherein, the tool base attaches to the overhead mounting system;
    wherein, the controller is configured to track the use of each tool body by each user ID.

11. The invention of claim 10, wherein the user ID is a personal control device.

12. The invention of claim 1, wherein the user ID is a name badge.

13. The invention of claim 10, wherein the user ID is an RFID tag.

14. The invention of claim 10, wherein the tool ID is an RFID tag.

15. The invention of claim 10, wherein the use of certain tools is not restricted to identified users.

16. The invention of claim 10, wherein the tool base is connected to multiple other tools, which are also attached to the overhead mounting system.

17. A method for tracking and monitoring tools comprising:
   providing an overhead mounting system attached to a ceiling;
   providing a base having a controller and a transceiver;
   providing at least one tool with ID tag; and
   user IDs;
   wherein the transceiver is adapted to receive information from the tool ID tags and the user IDs and relay that information to the controller;
   wherein, the controller monitors and records the use of the at least one tool; and
   wherein, the controller is configured to regulate access to the tool according to permissions associated with the tool ID tags and the user IDs;
   wherein, the tool base is attached to an overhead mounting system;
   wherein, the controller is configured to track the use of each tool body by each user ID.

18. The method of claim 17, wherein use of certain tools is not restricted to identified users.

\* \* \* \* \*